H. AMMANN.
MILK RELEASING DEVICE.
APPLICATION FILED MAY 6, 1916.
1,281,259.
Patented Oct. 15, 1918.
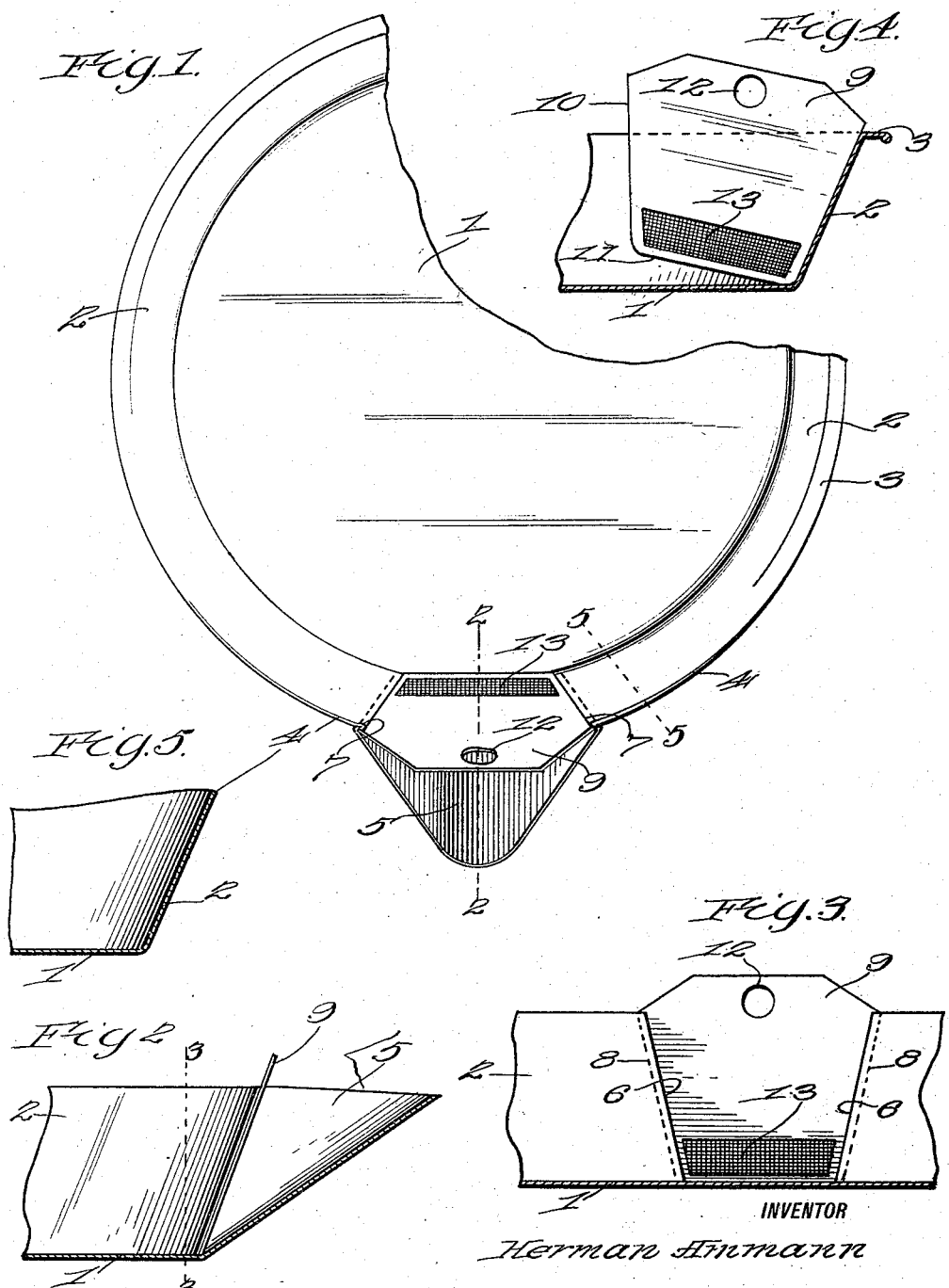
INVENTOR
Herman Ammann
Carl M. Crawford
ATTORNEY

UNITED STATES PATENT OFFICE.

HERMAN AMMANN, OF GLACIER PARK, MONTANA.

MILK-RELEASING DEVICE.

1,281,259.      Specification of Letters Patent.      Patented Oct. 15, 1918.

Application filed May 6, 1916. Serial No. 95,968.

*To all whom it may concern:*

Be it known that I, HERMANN AMMANN, a citizen of the United States, residing at Glacier Park, in the county of Teton and State of Montana, have invented a new and useful Improvement in Milk-Releasing Devices, of which the following is a specification.

This invention relates to an improved means for releasing milk from beneath the cream so as to avoid the present methods of skimming off the cream by means of spoons or like skimmers.

The time consumed in skimming the cream off from the milk of a plurality of receptacles is very considerable even when the operation does not involve dairy quantities. Furthermore, in places where relatively large quantities of milk and cream are supplied, and in the absence of mechanical separator, the operation of skimming off the cream is a very great handicap to economical production. These defects not only result from the time consumed, but from the fact that either a considerable amount of the cream is not recovered, or the richness of the cream is impaired by too great inclusion of the milk.

It is one of the special objects of this invention to provide a receptacle, preferably in the form of a pan, with a novel character of open spout intersecting the wall of the receptacle substantially throughout the height of the latter and having communication with the interior of the receptacle throughout an open way of considerable dimension not only near the top but adjacent the bottom thereby affording the greatest possible capacity for egress of the milk thereto.

In combination with this novel form of spout, and as a separate invention as an article of manufacture, I provide a partition adapted for downward insertion, preferably at the juncture of the spout with the receptacle, in such a manner as to divide the former from the latter. This dividing partition preferably extends from the bottom of the trough to a point above the top of the receptacle, and in the most preferred embodiment, I provide the partition with a strainer which is located near the lowest portion of the partition. The function of the strainer is to provide for egress discharge of the milk from beneath the cream when the pan or receptacle is tilted into a pouring position, and further, the novel partition presents an imperforate area to the cream with a perforate area for the milk.

A further feature of novelty consists in making the partition readily insertible and withdrawable so that after the cream has raised throughout the area of the liquid level, both in the receptacle and the spout, the partition may be withdrawn to shift the cream from the spout back into the receptacle before the latter is tilted to release the milk, the partition being again inserted during such milk releasing operation.

A further feature of novelty consists in providing the partition with edged portions shaped to conform to the shape of the wall in bottom of the pan or receptacle so that the partition may be effectively utilized for the purpose of loosening the cream from the interior of the receptacle wall and also scraping the cream from the bottom.

My invention also includes the novel feature of making these spout pans or receptacles in such a manner that they may be effectively nested for shipment, and constructing the same in such a manner that one partition strainer may answer for a plurality of receptacles thereby not only reducing the amount of equipment for initial purchase, but also rendering the receptacles of convenient utility for general purposes.

My inventiton has other objects and features of novelty which will be more fully described in connection with the accompanying drawing and which will be more particularly pointed out in and by the appended claims.

In the drawing:—

Figure 1 is a plan view of a receptacle or pan equipped with one form of the device of my invention.

Fig. 2 is a sectional view on line 2—2 of Fig. 1.

Fig. 3 is a sectional view on line 3—3 of Fig. 2.

Fig. 4 is a sectional view of the receptacle showing the manner in which the partition may be utilized for loosening or scraping the cream from the interior of the receptacle wall.

Fig. 5 is a sectional view on line 5—5 of Fig. 1, illustrating a greater height of receptacle wall adjacent spout.

Like characters of reference designate similar parts throughout the different figures of the drawing.

As illustrated 1 designates the bottom wall of a receptacle which is in the form of a tin pan, in this particular embodiment shown. The pan has an annular wall 2 extending upwardly from the bottom 1 for the required depth or height to provide the pan with the requisite containing capacity. The wall 2 terminates in an outwardly projecting flange 3, extending substantially throughout the circumference of the upraise of the wall. Adjacent the spout, which will be presently described, I preferably turn up the flange 3, as indicated at 4 so as to prevent the contents of the pan from overflowing as the spout portion is lowered into a pouring position.

A spout 5 is suitably formed on or attached to the wall of the pan, as shown, and the wall of the pan is interrupted by an open way described by the bottom 1 and the diverging line 6. This open way is of relatively considerable size as will be seen by reference to Fig. 3, and it extends from the bottom 1 to the top of the wall. The juncture of the spout with the wall is equipped with a groove, on each side, which may be formed by doubling the material upon itself as indicated at 7 to form downwardly converging grooved margins, the depth of which is indicated by dotted lines 8. Insertible into said grooves is my novel divider or partition 9 which is provided with downwardly converging straight side edges 10 and a straight bottom edge 11. Furthermore, the partition is so proportioned that the horizontal dimensions, looking at Fig. 3, will very slightly exceed the distance between the juncture grooves, thereby necessitating the exercise of some little thrust in inserting the partition into the position shown in Fig. 3. By reason of this construction, the pan wall will be slightly spread or sprung from its normal position and the resulting grip on the partition will hold the same firmly in position.

I may provide the partition 9 with a finger grip opening 12, near the top thereof, but the remaining portions of the upper part of the partition is imperforate. In the lower portion of the partition I provide a strainer 13 which is sufficiently low in position to normally be even below the milk level, and thus below the cream, when the pan is only partially filled. However, the elongated form of the strainer affords such a considerable straining area as to provide for the freest possible releasing discharge of the milk therethrough.

While I will in every case desire to release the milk from beneath the cream, I do not wish to be limited in all constructions to this particular form of partition.

In use, a number of receptacles will be filled to the desired extent with milk and will be allowed to set until the cream raises, only one partition being necessary for the entire pan equipment in case that only one operative performs the separating process. The cream will raise in the spout portions as well as in the pan portion and when the time comes to release the milk, a partition will be utilized for shifting the surface cream from the spout portion back into the pan and then the partition will be inserted in the position shown in Fig. 3. With suitable milk and cream receiving receptacles, such as pitchers, for instance, the pan will be elevated and then tilted in a manner to lower the spout whereby the milk will be released for free flow into the milk receptacle. The extent of flow can be easily regulated by the extent of tilt of the pan and because of the upwardly opening spout, there will be no vacuum created and therefore no eddies will be formed to suck the cream outwardly through the strainer. The operation of pouring will be continued until the operative observes the slightest entry of cream into the spout whereupon, and without further adjustment, excepting the removal of the partition, the remaining cream may be poured out of the spout into the receptacle originally provided. Very rich cream will adhere to the walls and body of the pan and therefore in completely removing all the cream, it may be necessary to scrape the wall and body with the side edge 10 and bottom edge 11 of the partition. It will be noted by reference to Fig. 4 that the bottom edge 11 merges into the side edges 10 on a curve similar to the curvature at the junction of the wall 2 with the bottom 1 thereby permitting the pan to be very effectively scraped. It will thus be seen that the partition has a novel interdependent relation to the pan irrespective of the function it performs as a strainer and divider.

It is believed that the novelty and utility of my invention will be clearly understood from the foregoing description and while I have herein shown and described one specific form of my invention, I do not wish to be limited thereto except for such limitations as the claims may import.

I claim:—

1. In a milk releasing device, a pan-like receptacle having its wall cut away from the top thereof to the bottom of said receptacle on straight lines converging toward the bottom, an open spout of substantially U-shaped construction attached to said wall abreast of said cut away portion and there being a groove formed at the juncture of said spout with said wall, and a partition having straight converging side edges for engagement with said groove and proportioned to spread said wall opening when said partition is inserted to separate said spout from said receptacle to insure a tight fit of said partition, said partition having a strainer near its bottom for release of the milk therethrough as the receptacle is tilted, substantially as described.

2. In a milk releasing device, a pan having a transversely straight wall flaring from the bottom of said pan toward the top thereof and said pan having a flat bottom joining said wall on a slight curve, a spout for said pan opening throughout its cross section to the interior of said pan, and a partition insertible at the juncture of said spout with said wall for dividing off the pan from said spout and said partition having a strainer for releasing the milk, said partition having straight side edges adapted to abut in continuous engagement against the interior of said wall to loosen and scrape the cream therefrom, and said partition having a straight bottom scraping edge for loosening the cream from the bottom of said pan, substantially as described.

3. In a milk releasing device, a pan having a spout, and a strainer partition for dividing the spout off from said pan and said partition having edge portions shaped to conform to the interior of the pan to scrape the latter, substantially as described.

4. In a milk releasing device, a pan provided with a substantially U-shaped open pouring spout, and a partition insertible at the juncture of said spout with said pan for dividing off the former from the latter when pouring and said partition having a strainer in its lower portion disposed below the cream level for releasing the milk from below the cream, when the pan is tilted, said partition being withdrawable before the pan is tilted to shift the cream in said spout back into said pan, substantially as described.

5. In a device of the character described, a pan having a pour off spout and a partition for dividing the spout from the interior of the pan, the material of the side walls of the pan, adjacent the spout, being doubled upon itself to form grooves, the partition being adapted for engagement with said grooves, said partition having an opening near its lower end and being imperforate throughout the remainder of its area.

In testimony that I claim the foregoing as my own, I hereby affix my signature.

HERMAN AMMANN.

Copies of this patent may be obtained for five cents each, by addressing the "Commissioner of Patents, Washington, D. C."